United States Patent
Gafur et al.

(10) Patent No.: US 10,908,566 B2
(45) Date of Patent: Feb. 2, 2021

(54) MODEL PREDICTIVE STRIP POSITION CONTROLLER

(71) Applicant: PRIMETALS TECHNOLOGIES GERMANY GMBH, Erlangen (DE)

(72) Inventors: Ilhom Gafur, Fürth (DE); Anastasiia Galkina, Linz (AT); Kurt Schlacher, Linz (AT)

(73) Assignee: PRIMETALS TECHNOLOGIES GERMANY GMBH

( * ) Notice: Subject to any disclaimer, the term of this patent is extended or adjusted under 35 U.S.C. 154(b) by 95 days.

(21) Appl. No.: 16/074,452

(22) PCT Filed: Dec. 7, 2016

(86) PCT No.: PCT/EP2016/080040
§ 371 (c)(1),
(2) Date: Aug. 1, 2018

(87) PCT Pub. No.: WO2017/133814
PCT Pub. Date: Aug. 10, 2017

(65) Prior Publication Data
US 2019/0041812 A1    Feb. 7, 2019

(30) Foreign Application Priority Data
Feb. 4, 2016   (EP) .................... 16154225

(51) Int. Cl.
*G05B 13/04*   (2006.01)
*B21B 37/68*   (2006.01)
(Continued)

(52) U.S. Cl.
CPC ............ *G05B 13/048* (2013.01); *B21B 37/68* (2013.01); *B21B 38/00* (2013.01); *G01B 11/028* (2013.01);
(Continued)

(58) Field of Classification Search
CPC .......... B21B 2271/025; B21B 2273/04; B21B 2273/14; B21B 37/68; B21B 38/00; G01B 11/028; G05B 13/048
See application file for complete search history.

(56) References Cited

U.S. PATENT DOCUMENTS 6,340,108 B1 *   1/2002   Isoyama ............. B21B 15/0085
                                                    228/102
9,547,290 B2     1/2017   Dagner et al.
(Continued)

FOREIGN PATENT DOCUMENTS

CN    102632085 A    8/2012
CN    103418619 A    12/2013
(Continued)

OTHER PUBLICATIONS

Office Action dated May 31, 2019 in corresponding Chinese Patent Application No. 201680081042.X.
(Continued)

*Primary Examiner* — Chad G Erdman
(74) *Attorney, Agent, or Firm* — Ostrolenk Faber LLP (57) ABSTRACT

When the strip head (7) of a metal strip (1) runs out of a roll stand (2a), a lateral position (y) of the strip head (7) is detected by a detection device (8) at at least one location (P) lying between the roll stand (2a) and a device (8) arranged downstream of the roll stand. A strip position controller (10) is designed as a model predictive controller which ascertains a sequence of adjusting commands ($u_k$) to be output one after the other in a work cycle (T) on the basis of the detected lateral position (y) of the strip head (7), and the sequence is used to adjust a respective roll gap wedge. The number of control commands ($u_k$) define a prediction horizon (PH) of the strip position controller (10) in connection with the work cycle (T). The strip position controller (10) at least supplies (Continued)

the roll stand (2*a*) with the control command ($u_0$) ascertained to be output next.

15 Claims, 3 Drawing Sheets

(51) Int. Cl.
*B21B 38/00* (2006.01)
*G01B 11/02* (2006.01)

(52) U.S. Cl.
CPC ..... *B21B 2271/025* (2013.01); *B21B 2273/04* (2013.01); *B21B 2273/14* (2013.01)

(56) References Cited

U.S. PATENT DOCUMENTS

| | | | |
|---|---|---|---|
| 2005/0224210 A1* | 10/2005 | Hohenbichler | B22D 11/0622 164/480 |
| 2009/0113968 A1 | 5/2009 | Pawelski et al. | 72/14.1 |
| 2009/0277241 A1* | 11/2009 | Jonsson | B21B 37/28 72/9.2 |
| 2010/0269556 A1 | 10/2010 | Moretto et al. | 72/12.5 |
| 2013/0054003 A1* | 2/2013 | Weinzierl | B21B 37/74 700/153 |
| 2014/0090437 A1* | 4/2014 | Clark | B21B 28/04 72/250 |
| 2014/0129023 A1 | 5/2014 | Dagner et al. | 700/148 |
| 2014/0138290 A1* | 5/2014 | Saastamo | B65G 39/00 209/552 |
| 2019/0041812 A1 | 2/2019 | Gafur | |

FOREIGN PATENT DOCUMENTS

| | | |
|---|---|---|
| CN | 103547384 A | 1/2014 |
| DE | 197 04 337 A1 | 8/1998 |
| DE | 197 04 337 B4 | 11/2005 |
| DE | 10 2005 051 053 A1 | 4/2007 |
| DE | 10 2014 007 381 A1 | 7/2015 |
| JP | S60-148614 A | 8/1985 |
| JP | S63183713 A | 7/1988 |
| JP | H067819 A | 1/1994 |
| JP | 2006320933 A | 11/2006 |
| KR | 20140118049 A | 10/2014 |
| WO | WO 2005/072886 A1 | 8/2005 |

OTHER PUBLICATIONS

Y. Okamura et al. "State Feedback Control of the Strip Steering for Aluminum Hot Rolling Mills", IFAC (196), pp. 6275-6280.

Arno Barry Samuel Ferreira, "Adaptive Fuzzy Logic Steering Controller for a Steckel Mill", University of Johannesburg (2005) 204 pages total.

Hiroaki Kuwano et al., "Sensor-type Automatic Steerin Control System for Rolling Mill", UDC 621.771.23.012-58: 681.326: 681,586, vol. 19, No. 4 (1986) pp. 152-157.

N. Naumann et al. "Steering control at Arcelor Eko Stahl finishing HSM", Steel Times International (2007) pp. 38-42.

International Search Report dated Feb. 15, 2017 in corresponding PCT International Application No. PCT/EP2016/080040.

Written Opinion dated Feb. 15, 2017 in corresponding PCT International Application No. PCT/EP2016/080040.

Search Report dated Jul. 12, 2016 in corresponding European Patent Application No. 16154225.3.

Chinese Notification to Grant Patent Right for Invention, dated Dec. 2, 2020, issued in corresponding Chinese Patent Application No. 201680081042.X. Total 6 pages.

* cited by examiner

$$\eta = \frac{d'}{d}$$

MODEL PREDICTIVE STRIP POSITION CONTROLLER

CROSS-REFERENCE TO RELATED APPLICATIONS

The present application is a 35 U.S.C. §§ 371 national phase conversion of PCT/EP2016/080040, filed Dec. 7, 2016, which claims priority of European Patent Application No. 16154225.3, filed Feb. 4, 2016, the contents of which are incorporated by reference herein. The PCT International Application was published in the German language.

TECHNICAL BACKGROUND

The present invention proceeds from an operating method for a roll train, in which a metal strip is rolled. The roll train has at least one roll stand and a device disposed downstream of the roll stand, such that when the strip head runs out of the roll stand, a lateral position of the strip head is captured by a capture device such as a camera at at least one capture location lying between the roll stand and the device disposed downstream thereof.

Furthermore, the present invention proceeds from a computer program comprising machine code which can be executed by a control device for a roll train such execution of the machine code by the control device causes the control device to operate the roll train according to such an operating method.

Furthermore, the present invention proceeds from a control device for a roll train, wherein the control device is programmed with such a computer program such that the control device operates the roll train according to such an operating method.

Furthermore, the present invention proceeds from a roll train for rolling a metal strip, wherein the roll train has at least one roll stand and a device disposed downstream of the roll stand, wherein the roll train has a control device which operates the roll train according to such an operating method.

An operating method and a control device of the type set forth at the outset, and the corresponding roll train, are known from, e.g., DE 197 04 337 B4, JP S60 148 614 A or DE 10 2005 051 053 A1. Within the scope of these operating methods, a strip position controller is present which proceeds from the captured lateral position of the strip head, establishes a control command and applies the control command to the roll stand.

When rolling a metal strip in a hot strip finishing train, the metal strip should, where possible, be guided, with the highest possible running stability, and an ideal planarity result through the individual roll stands of the roll train. To this end, it should be sought, in particular, to guide the metal strip centrally and straight through the individual roll stands of the roll train. This also applies, in particular, in the threading phase of the metal strip, i.e., when the start of the metal strip (=strip head) has already emerged from one of the roll stands and strives toward the next roll stand or another downstream device (a coiler, in particular).

If there is an asymmetric deformation in the roll stand during the threading phase (i.e., if the metal strip has a thickness wedge applied to it, the metal strip does not run to the next roll stand or, in general, the downstream device in a straight line, but runs in a circular arc instead (this is also referred to as a strip saber in the art). Therefore, the metal strip arrives at the downstream device off center.

Once the size of the strip becomes too large, the lateral migration either is restricted by one-sided grinding at a lateral guide or the lateral migration develops in serpentine fashion within the two lateral guides. One-sided grinding damages the strip edges. Serpentine migration leads to an off-centered leading pass in the subsequent roll stand and, as a result, lends to planarity defects on account of the uncontrolled lateral strip movement. In the extreme case, the strip head may completely miss the roll gap of the next roll stand downstream or may enter the roll gap of the next roll stand downstream in doubled-up fashion. Both lead to negative results. In the extreme case, it is possible that the current metal strip can only be used as scrap or that, for example, be used as a result of so-called cobbles. There is even damage to the roll train.

In the prior art, the side guides are usually set tightly in order to leave the metal strip with only little freedom of lateral movement to the sides. As a consequence, the strip edges are ground off by the side guides and the strip is braced per se.

In practice, operators attempt to influence the straight run out of the strip head on sight by quickly correcting the oblique position of the work rolls. This activity is very demanding and requires much experience. Moreover, this often only has little success, even when performed by experienced operators, since the view from the control platform on the metal strip is at an inexpedient angle. Additionally, steam and dust often impair the view. Furthermore, only portions of the metal strip between the roll stands are visible. Moreover, very fast reactions are required in the rear roll stands of the roll train on account of the high transport speeds.

The procedure known from DE 197 04 337 B4 already leads to good results from the outset. However, the procedure known from DE 197 04 337 B4 is not yet ideal.

In JP S60 148 614 A, the deviation of the position of the rolled piece relative to a center position is weighted by a constant of proportionality. Furthermore, the deviation is differentiated with regard to time. The time derivative of the deviation is multiplied by a factor that is indirectly proportional to the current roll speed. This procedure, too, is not yet ideal.

US 2010/0 269 556 A1 has disclosed a method for controlling the lateral strip position in a roll train with a plurality of roll stands, in which the oblique positions of the work rolls in the roll stands form a vector. The vector is established from the product of a square matrix and a vector of the deviations of the strip position from a respective setpoint position, as captured on the run-out side of the roll stands. Thus, the control amplifier of US 2010/0 269 556 A1 is not a scalar but an amplification matrix. The publication "Steering Control at Arcelor Eko Stahl finishing HSM", published in Steel Times International, May/June 2007 describes that the coefficients of the square matrix are determined by model calculations, simulations and many tests in a real installation. This procedure is very complicated and does not allow quick commissioning.

In the promotional document "Adaptive Fuzzy Logic Steering Controller for a Steckel Mill" by Arno Barry Samuel Ferreira, November 2005, an adaptive fuzzy logic controller, trained by operators, is designed for a roll stand. The fuzzy logic controller reacting to the deviation of the strip position from a setpoint value and acting on the oblique position setpoint value of the work rolls. The initial rule base of the fuzzy logic is established by questioning the operators depending on important further variables and roll parameters such as, e.g., the differential roll force, material hardness, entering strip thickness, strip width and roll speed. This procedure requires much experience, it is very unfocused and it does not allow quick commissioning.

In the publication "Sensor-type Automatic Steering Control System for Rolling Mill" by Hiroaki Kuwano and Norio Takahashi, a PD controller with the deviation of the strip position as input variable and an oblique position setpoint value as output variable is designed on the basis of a simple stand and strip model. The controller parameters of the PD controller are designed as constants according to theoretical stability considerations. This design only can be ideal at a single work point.

A state controller with a state observer for the differential roll force and a superimposed integral-action controller for the deviation of the strip position are proposed, likewise on the basis of a simple stand and strip model, in the publication "State Feedback Control of the Strip Steering for Aluminum Hot Rolling Mills" by Y. Okamura and I. Koshino, IFAC 1996. The oblique position of the work rolls likewise serves as manipulated variable.

SUMMARY OF THE INVENTION

The object of the present invention consists in developing options for being able to set the strip position quickly and reliably.

The object is achieved by an operating method for a roll train having the features disclosed herein. Advantageous configurations of the operating method are disclosed.

According to the invention, an operating method of the type set forth at the outset is configured so that a strip position controller is embodied as a model predictive controller. On the basis of the captured lateral position of the strip head, the controller establishes a sequence of control commands to be output in succession with a work cycle, by means of which respectively one roll gap wedge is set. The number of control commands in conjunction with the work cycle defines a prediction horizon of the strip position controller. The strip position controller applies to the roll stand at least the next established control command to be output.

On account of the circumstance that a sequence is established, the number of control commands is therefore at least two. If n+1 denotes the number of control commands, n is consequently a natural number different from 0. n can have the value of 1 or any other value greater than 1. If T denotes the work cycle, the prediction horizon consequently arises as nT. Consequently, a superior control response can be obtained by the procedure according to the invention that control response, within the prediction horizon, also taking account of future expected control actions.

Model predictive control is as such unknown. Reference can be made, in a purely exemplary manner, to the German Wikipedia, "Model Predictive Control" entry, retrieved on Aug. 30, 2016.

The generic property of a model predictive controller, i.e., the property on account of which the controller is model predictive, consists, in general terms, of it (1) not only establishing a (1) control command for an actuator on the basis of the captured actual value underlying the control but also
(2) formulating a (complete) sequence of control commands for the prediction horizon,
(3) establishing the expected behavior of the considered system for the control commands of the formulated sequence in each case, based on a model, and
(4) then optimizing the formulated control commands overall, not only the next control command to be output,
(5) according to an optimization criterion.

Thus, this behavior of the controller is the property on account of which the controller only becomes a model predictive controller. The optimized control command to be output next is then used for the actuation of the actuator.

In a corresponding application of these general circumstances that are valid for every model predictive controller, the operating method according to the invention is consequently configured in such a way that, for the purposes of establishing the sequence of control commands to be output, the strip position controller 1) initially formulates a sequence of preliminary control commands, by means of which a roll gap wedge is set in each case,
2) establishes, in each case, the distance of the strip head from the roll stand to be expected when carrying out the formulated control commands up to the respectively considered control command and the lateral position of the strip head to be expected when carrying out the formulated control commands up to the respectively considered control command for the formulated control commands on the basis of a model of the roll train when proceeding from the captured lateral position of the strip head, and
3) optimizes the formulated control commands according to an optimization criterion and thus establishes the control commands to be output.

These steps occur within the scope of establishing the sequence of control commands to be output and hence thus also occur, in particular, before the optimized control commands are carried out. The formulated, i.e., not yet optimized, control commands are not even carried out as such. Carrying these out is only modeled within the scope of optimizing the control commands. The optimized control commands correspond to the control commands to be output.

In particular, it is possible that the strip position controller establishes the control commands in such a way that, within the prediction horizon, the roll gap wedge does not exceed a predetermined maximum roll gap wedge, the deviation of the lateral position of the strip head from a setpoint position does not exceed a predetermined maximum deviation and a quality function is minimized, wherein the quality function including at least the change of the roll gap wedge from control command to control command and/or a penalty term, the latter penalizing a predetermined maximum change of the roll gap wedge being exceeded from control command to control command.

This configuration can avoid, in particular, abrupt changes in the roll gap wedge and hence abrupt changes in the thickness wedge in the rolled strip. Nevertheless, a lateral migration of the strip head can be reliably avoided or at least restricted.

Preferably, the strip position controller, when establishing the control commands, takes account of the deviation of the lateral position of the strip head from the setpoint position lying within an admissible end deviation at the end of the prediction horizon as an additional boundary condition. This can ensure that the strip head enters the downstream device with a deviation within the admissible end deviation (i.e., virtually in the center or even exactly in the center). Particularly in the usual case, in which the downstream device likewise is a roll stand, this simplifies the leading pass of the metal strip in this roll stand. Furthermore, this can ensure that the metal strip runs out of the downstream device virtually centrally or even exactly centrally.

As an alternative or in addition thereto, the strip position controller, when establishing the control commands, takes account of a change in the lateral position of the strip head lying within an admissible end change at the end of the prediction horizon. This can ensure that the strip head enters the downstream device with a lateral movement within the admissible end change (i.e., virtually without transverse movement or even exactly without transverse movement). Particularly in the usual case, in which the downstream device likewise is a roll stand, this simplifies the leading pass of the metal strip in this roll stand. Furthermore, this can ensure that the metal strip runs out of the downstream device at least virtually without transverse movement.

In many cases, a new actual value is captured with each work cycle during a model predictive control. In this case, too, the sequence of control commands is respectively formulated and optimized with each work cycle. However, what may occur within the scope of the present invention is that the capture of further actual values is not possible. Therefore, the operating method according to the invention is preferably configured in such a way that the strip position controller also successively applies to the roll stand with the work cycle the further control commands to be output, either until all control commands to be output have been output or until the strip position controller establishes a sequence of control commands again on the basis of a renewed capture of the lateral position of the strip head.

As a rule, establishing a sequence of control commands again has priority over outputting the already established further control commands. Thus, as a rule, the already established further control commands are only output if a renewed capture of the lateral position of the strip head is not possible.

Preferably, the prediction horizon extends up to conveying the strip head to the downstream device. This can particularly reliably ensure an orderly entry into the downstream device.

In a further preferred configuration, the strip position controller establishes the lateral position of the strip head according to the relationships $$\dot{x} = v - \lambda \cdot y \cdot v \text{ and} \quad (1)$$

$$\dot{y} = \lambda \cdot x \cdot v \quad (2)$$

with $\lambda = \lambda 0 + \lambda 1 u$, where
x is a distance of the strip head from the roll stand,
y is the lateral position of the strip head,
$\lambda 0$ is a curvature of the metal strip caused by the metal strip as such,
$\lambda 1$ is an effectiveness of the respective control command,
v is a speed at which the metal strip runs out of the roll stand, and
u is the respective control command.

This modeling leads to particularly good results.

Preferably, provision is made for the lateral position of the strip head to be captured anew after applying to the roll stand a number of control commands and for the curvature of the metal strip caused by the metal strip as such and the effectiveness of the control commands, which are applied to the roll stand, to be tracked on the basis of a comparison of the newly captured lateral position of the strip head with an expected lateral position of the strip head. Here, the expected lateral position of the strip head is the position that is expected within the scope of establishing the control commands after the control command last applied to the roll stand.

As a result of this configuration, there can be an adaptation of the strip position controller, in particular from metal strip to metal strip. In certain circumstances, the adaptation of the strip position controller can even take place while rolling a metal strip.

Preferably, the strip position controller uses a Kalman filter to track the curvature of the metal strip caused by the metal strip as such and the effectiveness of the control commands that are applied to the roll stand. As a result of this configuration, there can be, in particular, robust and stable tracking that is hardly influenced by noise of the captured lateral positions.

Preferably, the strip position controller initially establishes the effectiveness of the respective control command on the basis of the relationship $$\lambda 1 = \frac{2}{L \cdot (s1 + s2)} \quad (3)$$

or by way of the relationship $$\lambda 1 = \frac{2}{L \cdot (h1 + h2)} \quad (4)$$

or by way of the relationship $$\lambda 1 = \frac{v'}{\eta^2 \cdot d \cdot v'} \quad (5)$$

where
L is a distance from an operating-side adjustment device for setting the roll gap of the roll stand to a drive-side adjustment device for setting the roll gap of the roll stand,
s1 and s2 are an operating-side and a drive-side roll gap,
h1 and h2 are an operating-side and a drive-side thickness of the metal strip,
v' is a speed of the metal strip on the intake side of the roll stand,
η is a draft occurring when rolling the metal strip in the roll stand and
d is a thickness of the metal strip on the intake side of the roll stand.

As a result of this configuration, the effectiveness of the control command by the strip position controller already can be set initially to a correct or at least virtually correct value.

It is possible that the lateral position of the strip head is only captured once (selectively) and, building thereon, the future control commands to be output are established. In this case, the control commands are established once and output sequentially one after the other. However, the position of the strip head is preferably captured repeatedly. In this case, only the most recently established control commands are valid. Previously established control commands, i.e., control commands that were established on the basis of an earlier captured temporal position of the strip head, lose their validity.

Repeatedly capturing the position of the strip head is possible, in particular, if the position of the strip head is captured in an areal region by means of the capture device. An example of such a capture device is a camera.

In the transport direction, as seen from the roll stand to the downstream device, the areal region should have an extent that is as large as possible. In particular, the extent should be at least 20% of a distance of the roll stand from the downstream device. By way of example, in the case of a (typical) distance of the downstream device from the roll stand of approximately 5.5 m, the extent can be approximately 1.60 m (corresponding to just under 30%) or more.

Furthermore, the object is achieved by a computer program. According to the invention, executing the computer program causes the control device to operate the roll train according to an operating method according to the invention.

Furthermore, the object is achieved by a control device for a roll train. According to the invention, the control device is programmed with a computer program according to the invention such that the control device operates the roll train according to an operating method according to the invention.

Furthermore, the object is achieved by a roll train. According to the invention, the control device operates the roll train, in each case according to an operating method according to the invention.

The above-described features, properties and advantages of this invention and the manner in which they are achieved will become clearer and more easily understandable in conjunction with the following description of the exemplary embodiments, which are explained in more detail in conjunction with the drawings. Here, schematically in the figures:

DESCRIPTION OF EMBODIMENTS

Figure 1:
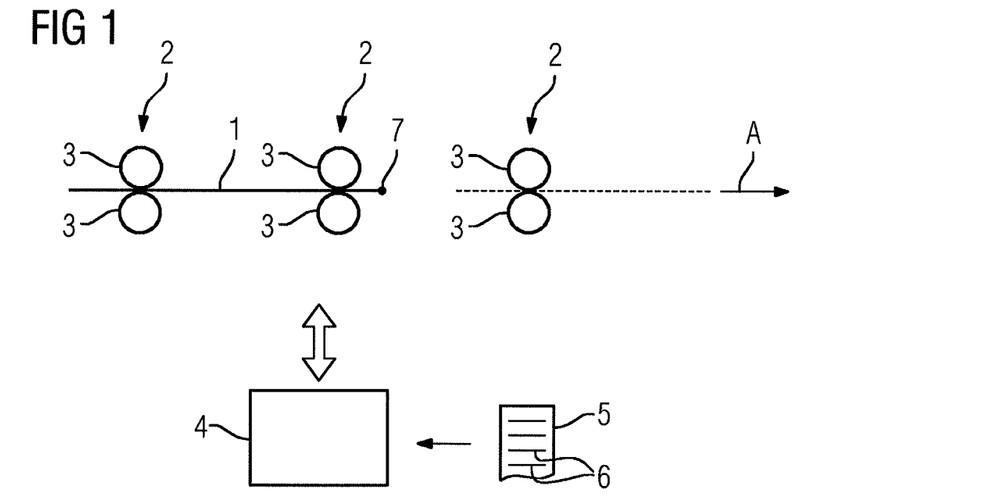
FIG. 1 shows a roll train having a plurality of roll stands.

According to FIG. 1, a metal strip 1 should be rolled in a roll train. The metal strip 1 is conveyed through the roll train in a transport direction A. For example, the metal strip 1 can be a steel strip, an aluminum strip, a copper strip, a brass strip or a strip consisting of any other metal. The roll train has a plurality of roll stands 2. Usually, there are between four and eight roll stands 2, for example, five, six or seven roll stands. Only the work rolls 3 of the roll stands 2 are presented in FIG. 1 (and in the other Figures, too). However, the roll stands 2 usually have further rolls in addition to the work rolls 3, in particular back up rolls, in the case of four-high stands, in addition to the work rolls 3 and backup rolls and intermediate rolls, in the case of six-high stands, in addition to the work rolls 3. The work rolls 3, the intermediate rolls and/or the back up rolls can be axially displaceable. However, this is not mandatory. Often, a toiler (not illustrated in the figures) is present behind the last roll stand 2.

The roll train is controlled by a control device 4. As a rule, the control device 4 controls the entire roll train. Thus, it is only present once for all roll stands 2 of the roll train. However, a parameterization of the control device 4 in respect of the individual roll stands 2 can differ from roll stand 2 to roll stand 2.

As a rule, the control device 4 is embodied as a software-programmable control device 4. Therefore, it is programmed by a computer program 5 non-transitory and recorded on a recordable medium. The computer program 5 determines the mode of operation of the control device 4. The computer program 5 comprises machine code 6, which is executable by the control device 4. Executing the machine code 6 causes the control device 4 to operate the roll train according to an operating method, which is explained in more detail below in conjunction with the further Figures.

Furthermore, the procedure according to the invention explained in more detail below is usually adopted for each roll stand 2. Therefore, only a single pair of roll stands 2 is considered below in conjunction with FIGS. 2 and 3, and also with the further Figures. However, the corresponding explanations apply to each such group of two roll stands 2 that directly follow one another in the transport direction A of the metal strip 1. Furthermore, the explanations also apply to the last roll stand 2 of the roll train, i.e., to the roll stand 2 that does not have a further roll stand 2 but a different device disposed downstream thereof, for example the coiler mentioned at the outset.

Figure 2:
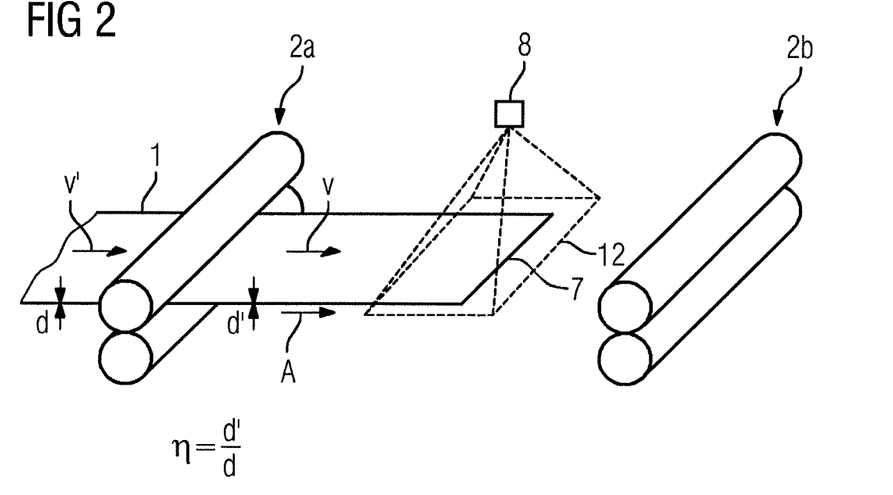
FIG. 2 shows two roll stands of the roll train in a perspective view.
Figure 3:
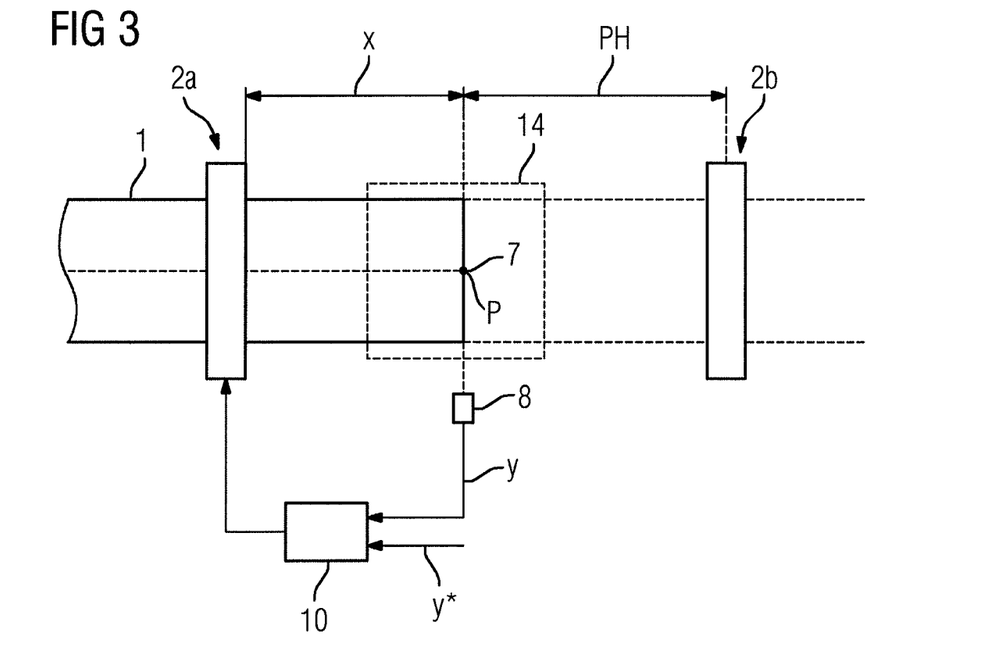
FIG. 3 shows the two roll stands of the roll train of FIG. 2 from above.

The leading roll stand 2 of FIGS. 2 and 3, i.e., the roll stand from which the metal strip 1 runs out, is the relevant roll stand 2. The trailing roll stand 2 corresponds to the downstream device. All that is important in respect of the trailing roll stand 2 is that the metal strip 1 is guided to the trailing roll stand 2. A coiler or any other device could also be present instead of the trailing roll stand 2. Therefore, the term "roll stand" and the reference sign 2a are used for the leading roll stand 2 below. The term "downstream device" and the reference sign 2b are used for the trailing roll stand 2.

What is furthermore of importance is that the strip head 7 of the metal strip 1, i.e., the start of the metal strip 1, has already run out of the roll stand 2a but has not yet reached the downstream device, roll stand 2b. This state is referred to, both usually and below, as the run out of the strip head 7 from the roll stand 2a.

While the strip head 7 runs out of the roll stand 2a, a lateral position y of the strip head 7 is captured at at least one capture location by means of a capture device 8. According to FIGS. 2 and 3, the capture location lies between the roll stand 2a and the downstream device 2b.

It is possible for the lateral position y of the, strip head 7 as such to be captured directly at the capture location. Alternatively, it is possible for the lateral position of strip edges, for example, to be captured and the lateral position y of the strip head 7 to be established by forming the mean value of the positions of the captured strip edges.

While executing (inter alia) the computer program 5, the control device 4 implements a strip position controller 10 for the roll stand 2a. The strip position controller 10 is supplied with the lateral position y. Furthermore, the strip position controller 10 is supplied with the distance x, at which the temporal position y was captured. It is possible that the control device 4 knows the distance x in advance or that the control device 4 establishes the distance x, for example on the basis of path tracking. Alternatively, it is possible that the distance x is captured by measurement technology and supplied to the strip position controller 10 as a measurement signal.

The strip position controller 10 is embodied as a model predictive controller. Such a controller establishes a sequence of control commands $u_k$ (k=0, ..., n) to be output within a prediction horizon PH. The control commands $u_k$ are output with a work cycle T of the strip position controller 10, for example with a work cycle T of 10 ms. n has at least the value of 1 and, as a rule, a value above 1, for example the value of 5, 8 or 10. Other numerical values are also possible. In conjunction with the work cycle T, the numerical value of n corresponds to the prediction horizon PH according to the relationship n×T=PH. The size of the prediction horizon PH can be determined according to requirements. In particular, it is possible according to the illustration in FIG. 3 for the prediction horizon PH to extend up to conveying the strip head 7 to the downstream device 2b.

Figure 4:
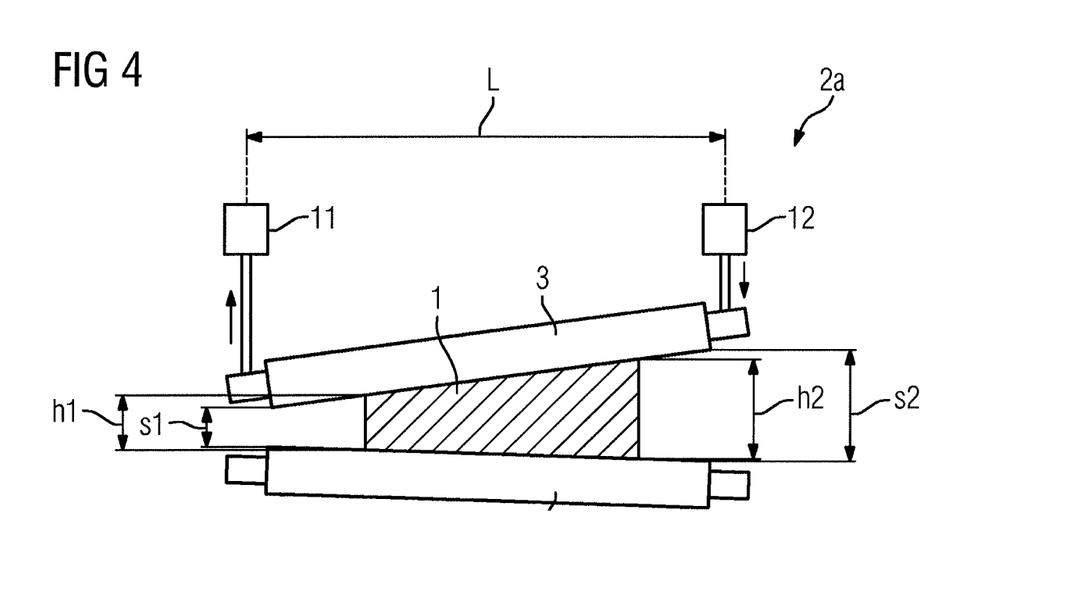
FIG. 4 shows a roll stand and
FIG. 5 shows a model predictive controller with a model of the roll stand.

A roll gap wedge is set in each case by means of the control commands $u_k$. In particular, the control commands $u_k$ can be characteristic for a differential roll force or a differential roll gap. In particular, in accordance with the illustration in FIG. 4, the control commands $u_k$ can act in an opposite sense on an operating side adjustment device 11 and a drive-side adjustment device 12. In particular, the adjustment devices 11, 12 serve to set the roll gap of the roll stand 2a. They can act directly or indirectly (via back up rolls, for example) on the work rolls 3. As a rule, the adjustment devices 11, 12 are embodied as hydraulic cylinder units.

Figure 5:
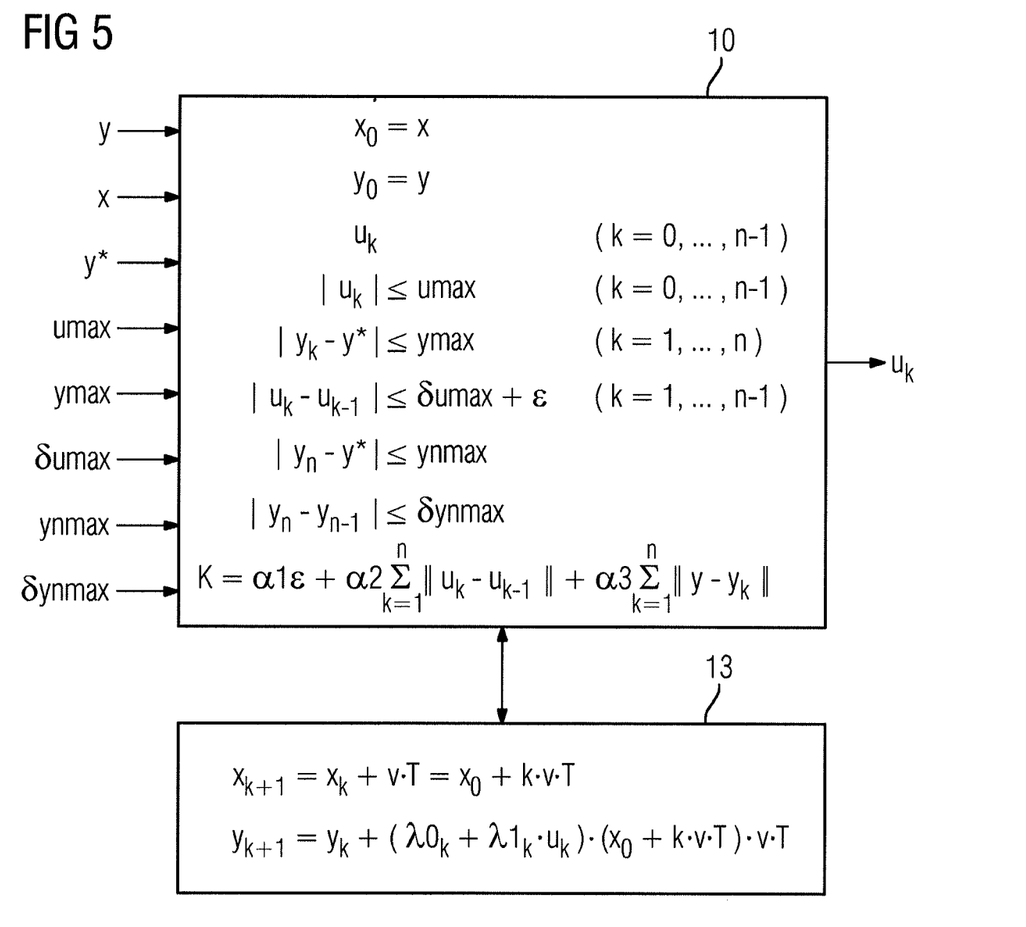

In accordance with the illustration in FIG. 5, the strip position controller 10 is supplied with the captured position y as a variable and a setpoint position y* as a parameter or as a variable. Furthermore, the distance x, at which the position y is captured, is supplied to the strip position controller 10 as a parameter or as a variable. Furthermore, the following variables are supplied to the strip position controller 10 as parameters:

a maximum roll gap wedge umax,
a maximum deviation ymax and
a maximum change δumax.

The maximum roll gap wedge umax is predetermined by the control limits of the roll stand 2a. By way of example, the maximum roll gap wedge umax can lie in the range of a few millimeters. The maximum deviation ymax is determined by the dimensions of the metal strip 1 in conjunction with the region of the downstream device 2b within which the metal strip 1 can run into the downstream device 2b. The maximum change δumax can be determined, firstly, by the dynamics of the adjustment devices 11, 12 and, secondly, by a corresponding demand on the quality of the produced metal strip 1.

Optionally, an admissible end deviation ynmax and/or an admissible end change δynmax can be supplied, furthermore, to the strip position controller 10 as additional parameters.

The strip position controller 10 establishes the control commands $u_k$. According to the illustration in FIG. 5, the control commands $u_k$ are established in such a way that, within the prediction horizon PH, the roll gap wedge, which is the result of the amount of the control commands $u_k$, does not exceed the maximum roll gap wedge umax and the deviation of the lateral position y of the strip head 7 does not exceed the maximum deviation ymax from the setpoint position y*.

Furthermore, the strip position controller minimizes a quality function K. In accordance with the illustration in FIG. 5, the quality function K can include the change of the roll gap wedge from control command $u_k$ to control command $u_k$ and a penalty term ε. As emerges from the illustration in FIG. 5, the penalty term ε penalizes the maximum change δumax being exceeded. Furthermore, by way of example, the displacement of the strip head 7 in relation to the captured position y of the strip head 7 can be included in the quality function K. By way of example, in accordance with the illustration of FIG. 5, the quality function K can have the following form:

$$K=\alpha 1\cdot \varepsilon +\alpha 2\cdot \Sigma_{k=1}^{n}\|u_k-u_{k-1}\|+\alpha 3\cdot \Sigma_{k=1}^{n}\|y-y_k\|. \quad (6)$$

α1 to α3 are weighting factors which each have a non-negative, real value. At least one of the weighting factors α1 and α2 is greater than 0. The weighting factor α3 can be zero or, alternatively, have a value greater than zero. The weighting factors α1 to α3 can be fixedly determined or parameterizable.

Consequently, on the basis of a model 13 of the controlled system for the sequence of control commands $u_k$, the strip position controller 10 in each case establishes the expected position $y_k$ of the strip head 7. It checks that the established control commands $u_k$ observe the constraints and minimizes the quality function K by varying the control commands $u_k$. The sequence of control commands $u_k$ which satisfies the constraints and minimizes the quality function K is the valid sequence of control commands $u_k$. The strip position controller 10 applies this sequence to the roll stand 2a. The application is carried out in accordance with the sequence of the established control commands $u_k$. Thus, the control command $u_0$ is output first, followed by the control command $u_1$, then the control command $u_2$, etc.

The control commands $u_k$ are applied until, based on a new establishment of the lateral position y of the strip head 7 and, optionally, based on a new establishment of the associated distance x from the roll stand 2a, a new prediction can take place. In the ideal case, not only is a control command $u_k$ output but the lateral position y of the strip head 7 and, optionally, the associated distance x from the roll stand 2a are established again during each work cycle T. In this case, the strip position controller 10 only outputs that control command $u_0$ to be output next at all times. The following control commands $u_1$, $u_2$, etc. become invalid with the new establishment of control commands $u_k$. However, it may also be the case that capture may not be possible during some work cycles T—for example, on account of steam or dust. It is also possible that the strip head 7 runs out of a capture region within which it is possible to capture the lateral position y of the strip head 7. In these cases, the following control commands $u_1$, $u_2$, etc., beyond the control command $u_0$ to be output next, are also output, either until all control commands $u_k$ have been output or until a new capture of the lateral position y of the strip head 7 is possible.

In order to establish the control commands $u_k$, the strip position controller 10 needs to implement a model 13 of the controlled system, as already mentioned above. The model 13 of the controlled system is based on the following approach:

The assumption is made that the strip head 7 is situated at a location P at a certain time. The location P has the coordinates x, y. x is the already aforementioned distance of the location P from the roll stand 2a; y is the already aforementioned lateral position of the strip head 7. The assumption is furthermore made that the metal strip 1 runs out of the roll stand 2a at the transport speed v. In this case, the following relationships apply to the change in the location P:

$$\dot{x} = v - (\lambda 0 + |1 \cdot u| \cdot y \cdot v \text{ and} \quad (7)$$

$$\dot{y} = (\lambda 0 + \lambda 1 \cdot u) \cdot x \cdot v. \quad (8)$$

Here, u is the respective control command. $\lambda 0$ is a curvature of the metal strip 1 caused by the metal strip 1 as such. Reasons for this curvature can lie in, for example, a thickness wedge in the metal strip 1 that is present a priori or a temperature wedge in the metal strip 1 that is present a priori. $\lambda 1$ characterizes an effectiveness of the current control command u.

These differential equations describe a circular arc with a superposed movement in the x-direction, along which the location P of the strip head 7 is guided.

Equations 7 and 8 have to be modified for the purposes of implementing the model 13 in the strip position controller 10. In particular, equations 7 and 8 are discretized such that modified equations emerge, for example the following equations in the case of a Euler discretization:

$$x_{k+1} = x_k + v \cdot T - (\lambda 0_k + \lambda 1_k \cdot u_k) \cdot y_k \cdot v \cdot T \text{ and} \quad (9)$$

$$y_{k+1} = y_k + (\lambda 0_k + \lambda 1_k) \cdot x_k \cdot v \cdot T. \quad (10)$$

Furthermore, to a good approximation, equation 9 can be replaced by equation 11 below:

$$x_{k+1} = x_k + y \cdot T = x_0 + k \cdot v \cdot T. \quad (11)$$

The effectiveness $\lambda 1$ of the respective control command $u_k$ and also the curvature $\lambda 0$ of the metal strip 1 caused by the metal strip 1 as such are presented as dependent on the respective output control command $u_k$ in equations 9 to 11. In fact, this dependence does not exist. However, the values for the effectiveness $\lambda 1$ of the respective control command $u_k$ and the curvature $\lambda 0$ of the metal strip 1 caused by the metal strip 1 as such are not known initially. However, they can be estimated with ever-improved accuracy within the scope of repeatedly carrying out the method. This will be explained in more detail below.

As a rule, the curvature $\lambda 0$ of the metal strip 1 caused by the metal strip 1 as such is assumed to be zero at the outset. For as long as there is no knowledge based on measurements about the effectiveness $\lambda 1$ of the current control command $u_k$, it is furthermore possible to initially undertake a good estimate of the effectiveness $\lambda 1$ of the respective control command $u_k$. In particular, the effectiveness $\lambda 1$ of the current control command $u_k$ at the outset can be established on the basis of the relationship $$\lambda 1 = \frac{2}{L \cdot (s1 + s2)}. \quad (3)$$

Here (see FIG. 4), L is a distance of the operating side adjustment device 11 from the drive-side adjustment device 12. s1 and s2 are the respective roll gaps set by means of the adjustment devices 11 and 12.

Alternatively, the effectiveness $\lambda 1$ of the respective control command $u_k$ can be initially established on the basis of the relationship $$\lambda 1 = \frac{2}{L \cdot (h1 + h2)}. \quad (4)$$

Here, h1 and h2 are the operating side and the drive-side thickness of the metal strip 1.

Alternatively, the effectiveness $\lambda 1$ of the respective control command $u_k$ can be initially established on the basis of the relationship $$\lambda 1 = \frac{v'}{\eta^2 \cdot d \cdot v}. \quad (5)$$

Here see FIG. 2, v' is a speed of the metal strip 1 on the intake side of the roll stand 2a, $\eta$ is a draft occurring when rolling the metal strip 1 in the roll stand 2a and d is a thickness of the metal strip 1 on the intake side of the roll stand 2a.

Within the scope of the procedure according to the invention, the transport speed v, with which the metal strip 1 runs out of the roll stand 2a, is captured by measurement technology as a rule. The capture can be direct or indirect. For example, an indirect capture lies in capturing the circumferential speed of the work rolls 3 of the roll stand 2a while taking account of the forward slip. Alternatively, the intended value of the transport speed v as such can also be used for taking account of the latter.

Different procedures are possible in respect of the thicknesses h1, h2 of the metal strip 1. Thus, it is possible, for example, for the thicknesses h1, h2 to be captured by measurement technology.

Alternatively, it is possible that these values are known for different reasons by the control device 4, for example by way of setpoint prescriptions or a pass sequence. Moreover, it is possible to use the mean value of the individual thicknesses h1, h2 rather than the individual values thereof.

The method explained above already works very well. However, it can be improved further. In particular, in accordance with the presentation in FIG. 5, it is possible for the strip position controller 10, when establishing the control commands $u_k$, to take account of the deviation of the lateral position y of the strip head 7 from the setpoint position y* lying within an admissible end deviation ynmax at the end of the prediction horizon PH as an additional boundary condition. The admissible end deviation ynmax can be selected to be very small. In particular, it can be virtually zero.

Likewise, corresponding to the presentation in FIG. 5, it is possible for the strip position controller 10, when establishing the control commands $u_k$, to take account of a change in the lateral position y of the strip head 7 lying within an admissible end change δynmax at the end of the prediction horizon PH as an additional boundary condition.

In principle, it is sufficient for the operating method to be carried out only once when the strip head 7 runs out of the roll stand 2a, i.e., for the position y of the strip head 7 to be selectively captured only once. This applies, in particular, if the prediction horizon PH extends up to the strip head 7 running into the downstream device 2b. However, it is alternatively possible to carry out the method repeatedly.

Preferably, the position y of the strip head 7 can be captured in an areal region 14 by means of the capture device 8. By way of example, such a capture is possible if the capture device 8 is embodied as a camera. The areal region 14 has an extent in the transport direction A from the roll stand 2a to the downstream device 2b. The extent is preferably at least 20% of a distance of the roll stand 2a from the downstream device 2b. For example, the roll stands 2 of a multi-stand roll train (more precise: the roll gaps thereof) have a distance from one another that usually lies between 5 m and 9 m, for example approximately 5.5 m. Cameras by means of which a capture region of approximately 1.60 m×2.40 m is capturable in the case of suitable positioning relative to the roll stand 2a are known. A spatial resolution of such cameras in the transport direction A usually lies in the region of a few mm, for example approximately 1 mm to approximately 5 mm. A spatial resolution transverse to the transport direction A usually lies in the millimeter range. Depending on the orientation of the camera, capturing around 29% to not quite 44% of the distance of the roll stands 2 from one another is possible in the case of an assumed spacing of the roll stands 2 from one another of 5.5 m. If need be, a plurality of cameras also can be arranged next to one another and/or behind one another. As a result, the areal region 14 can be even larger.

In such a case, the method, firstly, can be carried out repeatedly for as long as the strip head 7 is situated within the areal region 14. However, the previously established control commands $u_k$ become invalid with each new execution. Only the control commands $u_k$ established last are valid.

Therefore, for as long as the strip head 7 is situated within the areal region 14, only the control command $u_0$ established for the immediately subsequent time is output in each case (at least as a rule). However, an exception applies if, for example as a result of dust or steam, a capture of the lateral position y of the strip head 7 is not reliably possible in an individual case, even within the areal region 14. In this case, however, there can be a reliable control by the strip position controller 10 despite such disturbances when capturing the position y of the strip head 7. In particular, the following control commands $u_1$, $u_2$, etc. are also output by the strip position controller 10 in this case.

Furthermore, repeatedly capturing the position y of the strip head 7 can be used to track the curvature $\lambda 0$ of the metal strip 1 caused by the metal strip 1 as such and the effectiveness $\lambda 1$ of the control commands $u_k$, which are applied to the roll stand 2a, on the basis of a comparison of the newly captured lateral position y of the strip head 7 with an expected lateral position $y_k$ of the strip head 7. Here, the expected lateral position $y_k$ of the strip head 7 is the position that is expected within the scope of establishing the control commands $u_k$ after the control command $u_k$ which was applied to the roll stand 2a last.

Preferably, the strip position controller 10 uses a Kalman filter for tracking the curvature $\lambda 0$ of the metal strip 1 caused by the metal strip 1 as such and the effectiveness $\lambda 1$ of the control commands $u_k$. This is explained in more detail below.

A vector $X_k$ is formulated initially, said vector including the values $\lambda 0_k$, $\lambda 1_k$ and $y_k$:

$$X_k = \begin{pmatrix} \lambda 0_k \\ \lambda 1_k \\ y_k \end{pmatrix}. \quad (12)$$

Then, the following relationship applies:

$$X_{k+1} = D \cdot X_k. \quad (13)$$

Here, $D_k$ is the transformation matrix, by means of which the state $X_k$ is mapped to the state $X_{k+1}$. The following applies to matrix $D_k$:

$$D = \begin{pmatrix} 1 & 0 & 0 \\ 0 & 1 & 0 \\ vTx_k & vTx_k u_k & 1 \end{pmatrix}. \quad (14)$$

Furthermore, a vector c is formulated, by means of which the component $y_k$ can be extracted from the vector $X_k$ according to the relationship $$y_k = c^T X_k. \quad (15)$$

Accordingly, the vector c has the form $$c = \begin{pmatrix} 0 \\ 0 \\ 1 \end{pmatrix}. \quad (16)$$

The curvature $\lambda 0$ of the metal strip 1 caused by the metal strip 1 as such and the effectiveness $\lambda 1$ of the control commands $u_k$ cannot be observed directly. In order nevertheless to be able to establish that curvature $\lambda 0$ of the metal strip 1 caused by the metal strip 1 as such and the effectiveness $\lambda 1$ of the control commands $u_k$, a Kalman filter is formulated. The filter equations of the Kalman filter are as follows:

$$V_{k+1} = D_k \cdot M_k \cdot D_k^T \cdot c \cdot r^{-1} \quad (17)$$

$$X_{k+1} = X_k + V_k \cdot (y - c^T D_k \cdot X_k) \quad (18)$$

$$M_{k+1} = \alpha (I - V_k \cdot c^T) D_k P_k D_k^T. \quad (19)$$

Here (ignoring the index k and k+1):
V is a vector that defines a Kalman gain,
M is a 3×3 covariance matrix,
r is a real, positive number,
α is a real, positive number,
I is the identity matrix.

The initial value $V_0$ for the Kalman gain V can be established by virtue of, for example, solving an equation 17 before equations 18 and 19 when first solving equations 17 to 19 and the value arising there being used as initial value $V_0$. For example, the initial value $P_0$ for the covariance matrix P can be the identity matrix. r has the meaning of a measurement noise. r is provided by an educated estimate of an operator of the roll train and predetermined for the control device 4. Usually, the numerical value of r lies at values of between 0.1 mm and 3 mm. α has the meaning of a forgetfulness factor. The numerical value of α usually lies slightly above 1, for example at values between 1.00 and 1.01.

In order to track the vector $X_k$ by applying the Kalman filter, the vector $X_k$ is initially established by repeated application of equation 13 for the value of the index k whose corresponding manipulated variable $u_k$ was applied last to the roll stand 2a immediately before the lateral position y of the strip head 7 was captured. Then, equations 17 to 19 are calculated once.

Here, use is made of the currently valid values for the transformation matrix $D_k$, the vector $X_k$ and the captured position y of the strip head 7. As a result, the last valid values $V_k$, $P_0$ for the Kalman gain V and the covariance matrix P, and the vector $X_k$, are tracked. Consequently, the initial estimates for the curvature $\lambda 0$ of the metal strip 1 caused by the metal strip 1 as such and the effectiveness $\lambda 1$ of the control commands $u_k$ can be successively improved.

Even in the case of the method being carried out repeatedly, it is possible for the prediction horizon PH to extend up to the strip head 7 running into the downstream device 2b. In this case, the prediction horizon PH, to the extent that this is necessary, is adapted every time the method is carried out such that although said prediction horizon extends up to the strip head 7 running into the downstream device 2b, it does not extend therebeyond.

In summary, the present invention consequently relates to the following circumstances:

A lateral position y of the strip head 7 of a metal strip 1 is captured by means of a capture device 8 at at least one location P lying between a roll stand 2a and a downstream device 8 when the strip head 7 of the metal strip 1 runs out of the roll stand 2a. A strip position controller 10 is embodied as a model predictive controller which, based on the captured lateral position y of the strip head 7, establishes a sequence of control commands $u_k$ to be output in succession with a work cycle T, by means of which respectively one roll gap wedge is set. The number of control commands $u_k$ in conjunction with the work cycle T defines a prediction horizon PH of the strip position controller 10. The strip position controller 10 applies to the roll stand 2a at least the next established control command $u_0$ to be output.

The present invention has many advantages. Thus, for example, operators are unburdened. Furthermore, the strip head 7, and hence the entire metal strip 1, are guided more accurately. Often, even threading into a roll stand 2 disposed downstream of the roll stand 2a can take place in a fully automatic manner. The strip position controller 10 can be optimally designed in a simple manner. An optimal guide of the strip head 7 through the entire roll train is possible when applying the mode of operation according to the invention to all roll stands 2 of the roll train. The procedure according to the invention also is readily usable in the case of housed roll trains, as will find evermore use in future. The operators are unburdened; the quality and the output are increased. The speed with which a thickness wedge that is present changes in the metal strip 1 can be restricted. Inadmissible operating states, in particular operating states that could lead to cobbles, can be reliably avoided. Particularly in the case of a housed roll train, which will become ever more important in the future, the present invention can ensure a reliable guidance of the strip head 7.

Even though the invention was described and illustrated in more detail by the preferred exemplary embodiment, the invention is not restricted to the disclosed examples and other variations can be derived by a person skilled in the art herefrom without departing from the scope of the protection of the invention.

LIST OF REFERENCE SIGNS

1 Metal strip
2, 2a Roll stands
2b Downstream device
3 Work rolls
4 Control device
5 Computer program
6 Machine code
7 Strip head
8 Capture device
9 (unassigned)
10 Strip position controller
11, 12 Adjustment devices
13 Model
14 Areal region
A Transport direction
c, $X_k$ Vectors
d Inlet-side thickness of the metal strip
$D_k$ Transformation matrix
h1, h2 Thicknesses
I Identity matrix
K Quality function
k Index
L Spacing of the adjustment devices from one another
M Covariance matrix
n Numerical value
P Location
PH Prediction horizon
$P_0$, $V_0$ Initial values
Real number
s1, s2 Roll gaps
T Work cycle
T0 Time
u, $u_k$ Control commands
umax Maximum roll gap wedge
V Kalman gain
v Transport speed
v' Intake-side speed of the metal strip
x Distance
y Lateral position
$y_k$ Expected positions
ymax Maximum deviation
ynmax Admissible minimum deviation
y* Setpoint position
α Real number
α1 to α3 Weighting factors
δumax Maximum change
δynmax Admissible minimum change
ε Penalty term
η Draft
$\lambda 0$, $\lambda 0_k$ Curvature caused by the metal strip 1
$\lambda 1$, $\lambda 1_k$ Effectiveness of the control commands

The invention claimed is:

1. An operating method for a roll train, in which a metal strip is rolled,
wherein the roll train comprises at least one roll stand and a device disposed downstream of the roll stand;
the method comprising:
running the strip head out of the roll stand, and when running the strip head out of the roll stand, capturing a lateral position of the strip head by using a capture device at at least one location lying between the roll stand and the device disposed downstream;
operating a strip position controller embodied as a model predictive controller;
based on the captured lateral position of the strip head, establishing a sequence of control commands to be output in succession with a work cycle in order to laterally position the strip head by setting the roll gap wedge of the roll stand;
wherein the number of control commands in conjunction with the work cycle defines a prediction horizon of the strip position controller; and
applying the at least next control command of the strip position controller within the prediction horizon to the roll stand to set the roll gap wedge below a maximum roll gap wedge in order to laterally position the metal strip so that a lateral position of the strip does not exceed a maximum deviation from a set point position.

2. The operating method as claimed in claim 1, further comprising:
for the purpose of establishing the sequence of control commands to be output, operating the strip position controller to:
initially formulate a sequence of preliminary control commands, and setting by means of which a roll gap wedge in each case by the preliminary control commands;
establishing, in each case, the distance of the strip head from the roll stand which is to be expected when carrying out the formulated control commands up to a respectively considered control command;
establishing the lateral position of the strip head which is to be expected when carrying out the formulated control commands up to a respectively considered control command for the formulated control commands based on a model of the roll train when proceeding from the captured lateral position of the strip head; and
optimizing the formulated control commands according to an optimization criterion and thus establishing the control commands to be output.

3. The operating method as claimed in claim 2, further comprising,
establishing the control commands using the strip position controller such that, within the prediction horizon, a quality function is minimized; and
the quality function including at least one of a respective change of the roll gap wedge for successive control commands and a penalty term comprising penalizing a predetermined maximum change of the roll gap wedge being exceeded for respective control commands.

4. The operating method as claimed in claim 3, further comprising,
when establishing the control commands, the strip position controller takes account of the deviation of the lateral position of the strip head from the setpoint position lying within an admissible end deviation at the end of the prediction horizon as an additional boundary condition.

5. The operating method as claimed in claim 3, when establishing the control commands, the strip position controller takes account of a change in the lateral position of the strip head lying within an admissible end change at the end of the prediction horizon as an additional boundary condition.

6. The operating method as claimed in claim 1, further comprising successively applying to the roll stand with the work cycle the further control commands to be output by using the strip position controller, and so applying either until all control commands to be output have been output or until the strip position controller establishes a sequence of control commands again based on a renewed capture of the lateral position of the strip head.

7. The operating method as claimed in claim 1, further comprising the prediction horizon extends up to conveying the strip head to the downstream device.

8. The operating method as claimed in claim 1, further comprising carrying out the method repeatedly while the strip head runs out of the roll stand so that only the most recently established control commands are valid.

9. The operating method as claimed in claim 1, further comprising:
applying the at least next control command of the strip position controller to the roll stand in order to set the position of the metal strip.

10. The operating method as claimed in claim 1 An operating method for a roll train, in which a metal strip is rolled,
wherein the roll train comprises at least one roll stand and a device disposed downstream of the roll stand;
the method comprising:
running the strip head out of the roll stand, and when running the strip head out of the roll stand, capturing a lateral position of the strip head by using a capture device at at least one location lying between the roll stand and the device disposed downstream;
operating a strip position controller embodied as a model predictive controller;
based on the captured lateral position of the strip head, establishing a sequence of control commands to be output in succession with a work cycle in order to set the roll gap wedge of the roll stand;
wherein the number of control commands in conjunction with the work cycle defines a prediction horizon of the strip position controller; and
applying the at least next control command of the strip position controller to the roll stand in order to set the position of the metal strip,
wherein the strip position controller establishes the lateral position of the strip head according to the relationships $$\dot{x}=v-\lambda \cdot y \cdot v \text{ and} \qquad (1)$$

$$\dot{y}=\lambda \cdot x \cdot v \qquad (2)$$

with $\lambda=\lambda 0+\lambda 1 u$, where
x is a distance of the strip head from the roll stand;
y is the lateral position of the strip head;
$\lambda 0$ is a curvature of the metal strip caused by the metal strip;
$\lambda 1$ is an effectiveness of the respective control command;
v is a speed at which the metal strip runs out of the roll stand; and
u is the respective control command.

11. The operating method as claimed in claim 10, further comprising:
after applying a number of control commands to the roll stand capturing the lateral position of the strip head anew the curvature of the metal strip is caused by the metal strip and by the effectiveness of the control commands which are applied to the roll stand; and
tracking the foregoing based on a comparison of the newly captured lateral position of the strip head with an expected lateral position of the strip head, wherein the expected lateral position of the strip head is the position that is expected within the scope of establishing the control commands after the control command that is last applied to the roll stand.

12. The operating method as claimed in claim 11, further comprising the strip position controller uses a Kalman filter to track the curvature of the metal strip caused by the metal strip and tracks the effectiveness of the control commands that are applied to the roll stand.

13. The operating method as claimed in claim 10, wherein the strip position controller initially establishes the effectiveness ($\lambda 1$) of the respective control command based on the relationship $$\lambda 1 = \frac{2}{L \cdot (s1 + s2)} \quad (3)$$

or by way of the relationship $$\lambda 1 = \frac{2}{L \cdot (h1 + h2)} \quad (4)$$

or by way of the relationship $$\lambda 1 = \frac{v'}{\eta^2 \cdot d \cdot v}, \quad (5)$$

where
- L is a distance from an operating-side adjustment device for setting the roll gap of the roll stand to a drive-side adjustment device for setting the roll gap of the roll stand;
- s1 and s2 are an operating-side and a drive-side roll gap,
- h1 and h2 are an operating-side and a drive-side thickness of the metal strip;
- v' is a speed of the metal strip on the intake side of the roll stand;
- $\eta$ is a draft occurring when rolling the metal strip in the roll stand; and
- d is a thickness of the metal strip on the intake side of the roll stand.

14. A computer program having a non-transitory recording medium and comprising a machine code, the code can be executed by a control device for a roll train in which a metal strip is rolled,
wherein the roll train comprises at least one roll stand and a device disposed downstream of the roll stand,
wherein the executing of the machine code by the control device causes the control device to operate the roll train according to an operating method,
the operating method comprising:
running the strip head out of the roll stand, and when running the strip head out of the roll stand, capturing a lateral position of the strip head by using a capture device at at least one location lying between the roll stand and the device disposed downstream;
operating a strip position controller embodied as a model predictive controller;
based on the captured lateral position of the strip head, establishing a sequence of control commands to be output in succession with a work cycle in order to laterally position the strip head by setting the roll gap wedge of the roll stand;
wherein the number of control commands in conjunction with the work cycle defines a prediction horizon of the strip position controller; and
applying the at least next control command of the strip position controller within the prediction horizon to the roll stand to set the roll gap wedge below a maximum roll gap wedge in order to laterally position the metal strip so that a lateral position of the strip does not exceed a maximum deviation from a set point position.

15. A roll train for rolling a metal strip, wherein the roll train has at least one roll stand and a device disposed downstream of the roll stand along a path of the metal strip; and
the roll train has a control device which operates the roll train according to an operating method, the operating method comprising:
running the strip head out of the roll stand, and when running the strip head out of the roll stand, capturing a lateral position of the strip head by using a capture device at at least one location lying between the roll stand and the device disposed downstream;
operating a strip position controller embodied as a model predictive controller;
based on the captured lateral position of the strip head, establishing a sequence of control commands to be output in succession with a work cycle in order to laterally position the strip head by setting the roll gap wedge of the roll stand;
wherein the number of control commands in conjunction with the work cycle defines a prediction horizon of the strip position controller; and
applying the at least next control command of the strip position controller within the prediction horizon to the roll stand to set the roll gap wedge below a maximum roll gap wedge in order to laterally position the metal strip so that a lateral position of the strip does not exceed a maximum deviation from a set point position.

\* \* \* \* \*